US012382226B2

(12) United States Patent
Huang

(10) Patent No.: US 12,382,226 B2
(45) Date of Patent: Aug. 5, 2025

(54) DISPLAY DEVICE

(71) Applicant: ASUSTEK COMPUTER INC., Taipei (TW)

(72) Inventor: Lai-Shi Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 153 days.

(21) Appl. No.: 18/328,039

(22) Filed: Jun. 2, 2023

(65) Prior Publication Data

US 2024/0305929 A1 Sep. 12, 2024

(30) Foreign Application Priority Data

Mar. 8, 2023 (TW) ................................ 112108435

(51) Int. Cl.

*H04R 19/01* (2006.01)
*H04R 1/02* (2006.01)
*H04R 7/04* (2006.01)

(52) U.S. Cl.

CPC ........... *H04R 19/013* (2013.01); *H04R 1/028* (2013.01); *H04R 7/04* (2013.01); *H04R 2499/15* (2013.01)

(58) Field of Classification Search

CPC ........ H04R 1/028; H04R 19/013; H04R 7/04; H04R 7/045; H04R 2499/15

See application file for complete search history.

(56) References Cited

U.S. PATENT DOCUMENTS

| | | | | |
|---|---|---|---|---|
| 2005/0168139 A1* | 8/2005 | Xu | ............................ | G01L 1/24 313/506 |
| 2009/0102894 A1* | 4/2009 | Isono | .................. | H10N 30/874 29/25.35 |
| 2019/0025922 A1* | 1/2019 | Lu | ......................... | G06F 1/1626 |
| 2022/0069194 A1* | 3/2022 | Lee | ........................ | H04R 7/045 |
| 2023/0157176 A1* | 5/2023 | Cui | ...................... | H10N 30/857 257/40 |

FOREIGN PATENT DOCUMENTS

| | | | | |
|---|---|---|---|---|
| CN | 205158206 U | * 4/2016 | ............... | G06F 1/16 |
| CN | 110636420 A | * 12/2019 | ............ | H04R 17/00 |
| TW | 202211694 A | 3/2022 | | |

* cited by examiner

*Primary Examiner* — Oyesola C Ojo

(74) *Attorney, Agent, or Firm* — MUNCY, GEISSLER, OLDS & LOWE, P.C.

(57) ABSTRACT

Disclosed is a display device, including a display panel and at least one thin film actuator. The display panel includes a front side and a rear side that are opposite to each other. The thin film actuator is arranged on the rear side, and the thin film actuator indirectly drives the display panel to vibrate through a vibrating cavity or a connecting structure.

8 Claims, 7 Drawing Sheets

DISPLAY DEVICE

CROSS-REFERENCE TO RELATED APPLICATION

This application claims the priority benefit of TAIWAN application serial No. 112108435, filed on Mar. 8, 2023. The entirety of the above-mentioned patent application is hereby incorporated by reference herein and made a part of the specification.

BACKGROUND OF THE INVENTION

Field of the Invention

The disclosure relates to a display device, and in particular, to a display device with a sound generating function.

Description of the Related Art

In the field of display technology, the narrow-bezel or bezel-less design is an important development direction for displays currently. However, adopting the narrow-bezel or bezel-less design limits the position of the speaker, making the speaker fail to generate sound to a user.

BRIEF SUMMARY OF THE INVENTION

The disclosure provides a display device, including a display panel and at least one thin film actuator. The display panel includes a front side and a rear side that are opposite to each other. The thin film actuator is arranged on the rear side, and the thin film actuator indirectly drives the display panel to vibrate through a vibrating cavity or a connecting structure.

In the display device provided in the disclosure, the thin film actuator arranged on the rear side of the display panel is used to drive the display panel to vibrate to generate sound. Therefore, the display device provided in the disclosure does not need a bezel reserving space for a speaker, and ensures that the display device generates sound to a user, to provide the user with a better use experience.

DETAILED DESCRIPTION OF THE EMBODIMENTS

Specific implementations of the disclosure are described in more detail below with reference to the schematic drawings. Features and advantages of the disclosure are becoming more obvious through the following descriptions and claims. It is worth noting that the drawings are drawn by using an extremely simplified form and an imprecise proportion, which are only used for conveniently and clearly assisting in explaining the objective of the embodiments of the disclosure.

Figure 1:
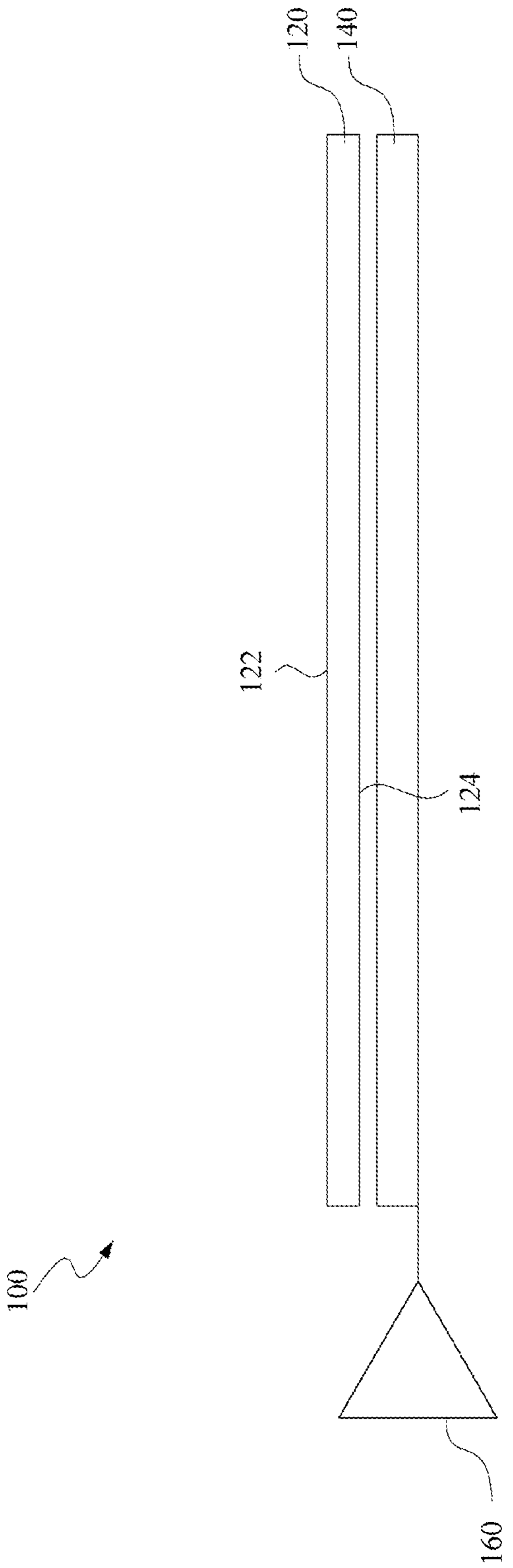
FIG. 1 is a schematic diagram of a display device according to a first embodiment of the disclosure.

FIG. 1 is a schematic diagram of a display device 100 according to a first embodiment of the disclosure. The display device 100 is a liquid crystal display, an organic light-emitting diode display, an electronic paper display, a tablet computer, a smartphone, a notebook computer, or another electronic product with a thin display panel to display a screen.

As shown in the figure, the display device 100 includes a display panel 120, a thin film actuator 140, and a drive circuit 160. The display panel 120 is a liquid crystal display panel, an organic light-emitting diode display panel, an electronic paper panel, or the like. In an embodiment, the thin film actuator 140 is an electret thin film actuator driven by Coulomb forces.

The display panel 120 includes a front side 122 and a rear side 124 that are opposite to each other. The thin film actuator 140 is arranged on the rear side 124 of the display panel 120. The drive circuit 160 is electrically connected to the thin film actuator 140, to drive the thin film actuator 140 to move, to drive the display panel 120 to vibrate to generate sound.

Figure 2:
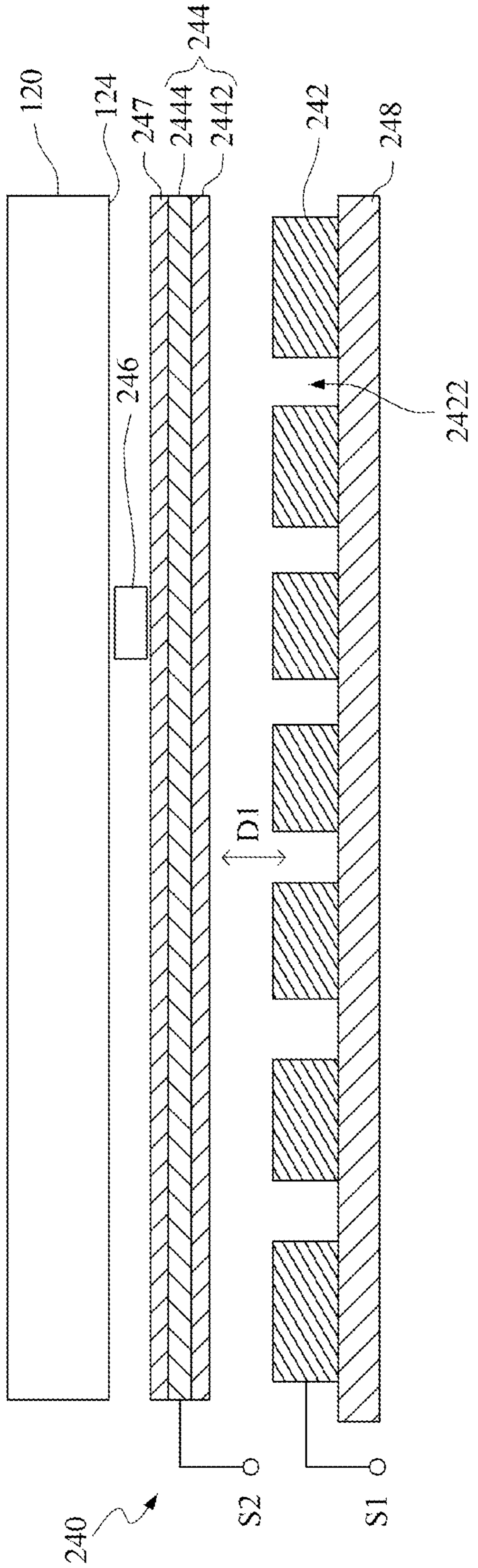
FIG. 2 is a schematic diagram of the first embodiment of a thin film actuator according to the disclosure.

FIG. 2 is a schematic diagram of the first embodiment of the thin film actuator 240. The thin film actuator 240 is applicable to the display device 100 shown in FIG. 1.

As shown in the figure, the thin film actuator 240 includes an electrode plate 242 and a flexible actuating film layer 244. The electrode plate 242 is fixedly arranged in the display device 100 and is provided with a plurality of holes 2422. The flexible actuating film layer 244 is located on one side of the electrode plate 242 facing the display panel 120 and is connected to the rear side 124 of the display panel 120 through a connecting structure 246. The flexible actuating film layer 244 is a layered structure formed by stacking an electret layer 2442 and an electrode layer 2444. The electret layer 2442 includes positive or negative charges.

In an embodiment, the thin film actuator 240 includes two insulating film layers 247 and 248, respectively located on one side of the flexible actuating film layer 244 facing the display panel 120 and one side of the electrode plate 242 away from the display panel 120 for electrical insulation.

The electrode plate 242 receives a first voltage signal S1, and the electrode layer 2444 of the flexible actuating film layer 244 receives a second voltage signal S2. The first voltage signal S1 is different from the second voltage signal S2, and an electric field is formed between the electrode plate 242 and the electrode layer 2444 to drive the flexible actuating film layer 244 to vibrate along an electric field direction D1.

In an embodiment, the electrode plate 242 receives a sound signal with a voltage change, the electrode layer 2444 is grounded (that is, receives a zero-potential signal), and an electric field change corresponding to the sound signal is generated between the electrode plate 242 and the electrode layer 2444 to drive the flexible actuating film layer 244 to vibrate. Alternatively, the electrode layer 2444 receives a reverse signal of the sound signal, and an electric field change corresponding to the sound signal is generated between the electrode plate 242 and the electrode layer 2444 to drive the flexible actuating film layer 244 to vibrate.

In this embodiment, a gap exists between the thin film actuator 240 and the display panel 120. The thin film actuator 240 indirectly drives the display panel 120 to vibrate to generate sound through the connecting structure 246. In other embodiments, the flexible actuating film layer 244 of the thin film actuator 240 is also directly attached to the rear side 124 of the display panel 120 to drive the display panel 120 to vibrate.

Figure 3:
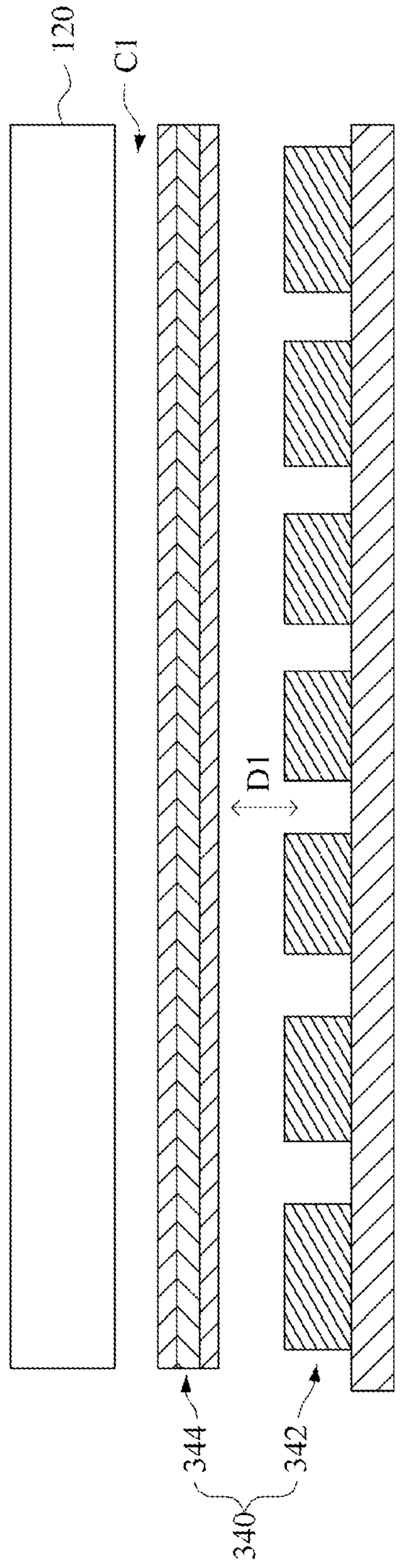
FIG. 3 is a schematic diagram of a second embodiment of the thin film actuator according to the disclosure.

FIG. 3 is a schematic diagram of a second embodiment of the thin film actuator 340 according to the disclosure. The thin film actuator 340 is applicable to the display device 100 shown in FIG. 1.

The thin film actuator 340 in this embodiment also includes an electrode plate 342 and a flexible actuating film layer 344. Unlike FIG. 2 in which the flexible actuating film layer 244 is connected to the rear side 124 of the display panel 120 through the connecting structure 246 to drive the display panel 120, the thin film actuator 340 in this embodiment does not include the connecting structure 246, vibration of the flexible actuating film layer 344 is transferred to the display panel 120 through a vibrating cavity C1 between the thin film actuator 340 and the display panel 120, to indirectly drive the display panel 120 to vibrate to generate sound.

Figure 4:
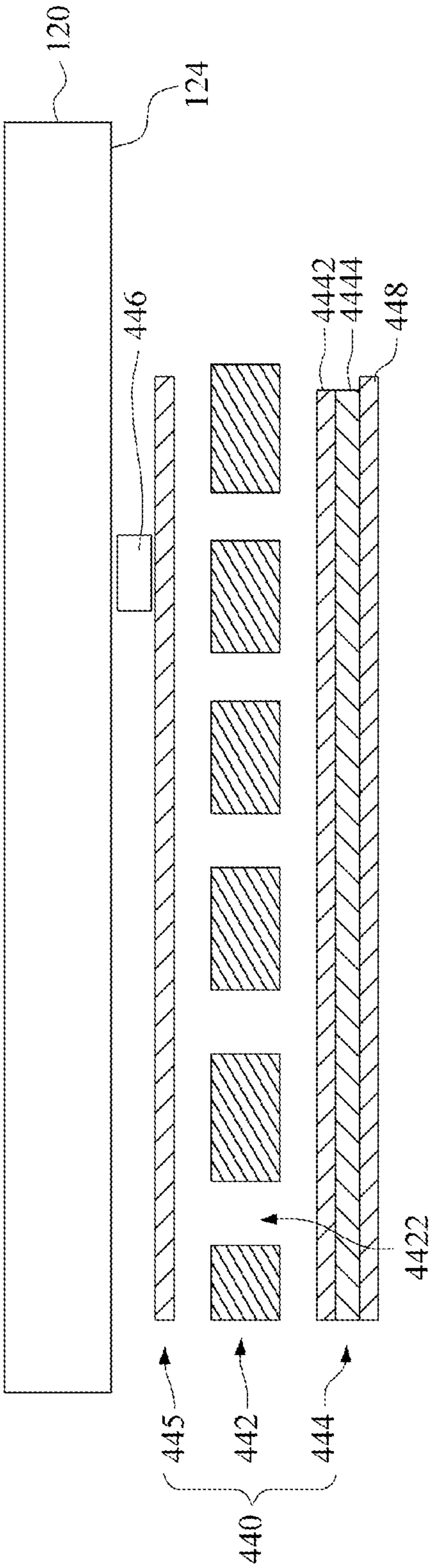
FIG. 4 is a schematic diagram of a third embodiment of the thin film actuator according to the disclosure.

FIG. 4 is a schematic diagram of a third embodiment of the thin film actuator 440 according to the disclosure. The thin film actuator 440 is applicable to the display device 100 shown in FIG. 1.

As shown in the figure, the thin film actuator 440 includes an electrode plate 442, a flexible actuating film layer 444, and an insulating film layer 445. The electrode plate 442 is fixedly arranged in the display device 100 and is provided with a plurality of holes 4422. The flexible actuating film layer 444 is a layered structure formed by stacking an electret layer 4442 and an electrode layer 4444.

Unlike FIG. 2 in which the flexible actuating film layer 244 is located on the side of the electrode plate 242 facing the display panel 120 and is connected to the rear side 124 of the display panel 120 through the connecting structure 246, the flexible actuating film layer 444 in this embodiment is located on one side of the electrode plate 442 away from the display panel 120, one side of the electrode plate 442 facing the display panel 120 is provided with the insulating film layer 445, and the insulating film layer 445 is connected to the rear side 124 of the display panel 120 through a connecting structure 446.

Because the electrode plate 442 is provided with the plurality of holes 4422, vibration generated by the flexible actuating film layer 444 is effectively transferred to the insulating film layer 445 through the holes 4422. Because the insulating film layer 445 is independent from the electrode plate 442, the vibration generated by the flexible actuating film layer 444 drives the display panel 120 to vibrate through the insulating film layer 445 to generate sound.

In an embodiment, the thin film actuator 440 includes another insulating film layer 448 located on one side of the flexible actuating film layer 444 opposite to the display panel 120 for electrical insulation.

Figure 5:
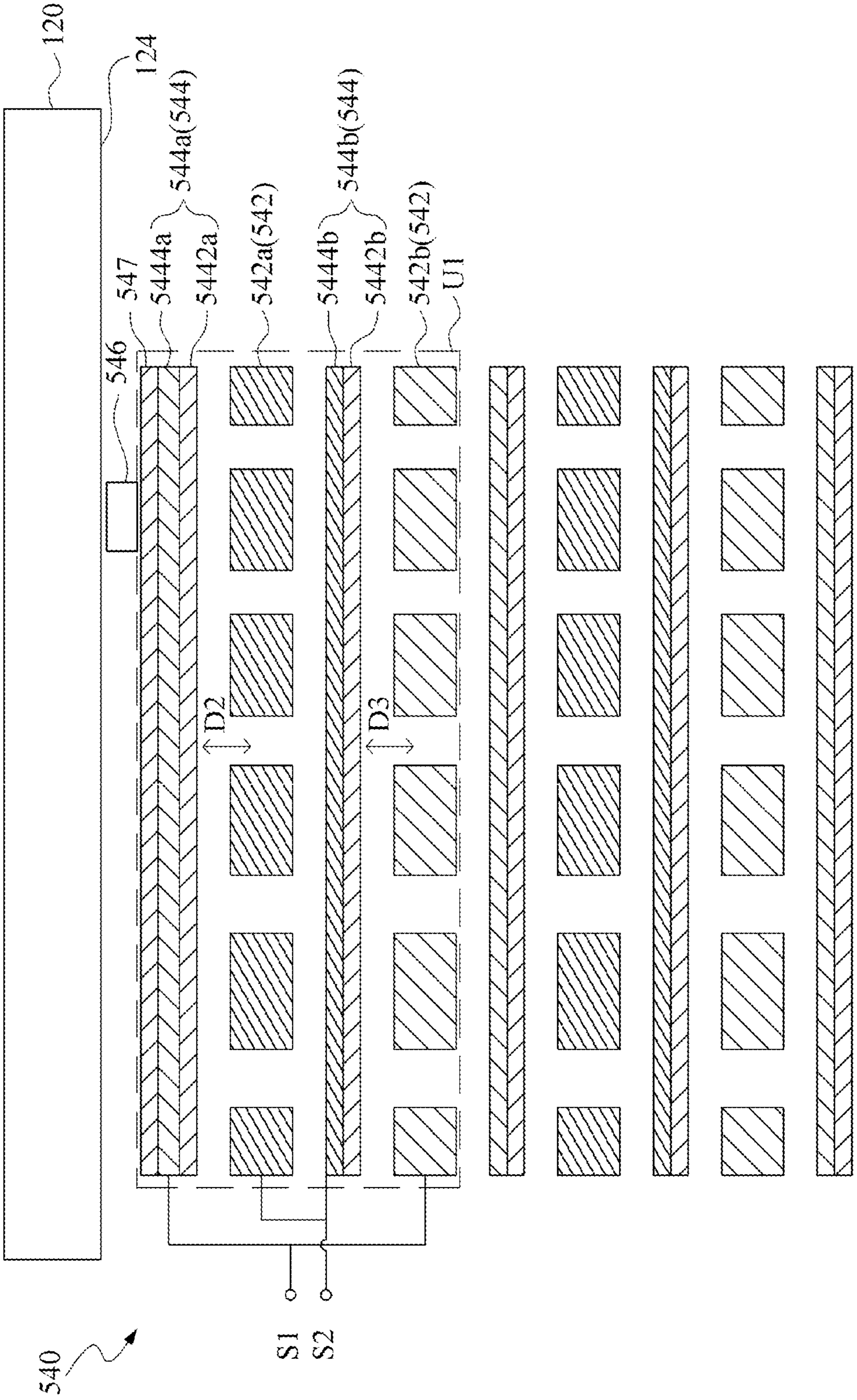
FIG. 5 is a schematic diagram of a fourth embodiment of the thin film actuator according to the disclosure.

FIG. 5 is a schematic diagram of a fourth embodiment of the thin film actuator 540 according to the disclosure. The thin film actuator 540 is applicable to the display device 100 shown in FIG. 1.

Compared with the embodiment in FIG. 2, the thin film actuator 540 in this embodiment includes a plurality of electrode plates 542 and a plurality of flexible actuating film layers 544 that are interleaved. In the following, the electrode plates 542 are represented as a first electrode plate **542*a* and a second electrode plate 542*b* respectively, and the flexible actuating film layers 544 are represented as a first flexible actuating film layer 544*a* and a second flexible actuating film layer 544*b*** respectively for ease of description.

As shown in the figure, the thin film actuator 540 includes a plurality of actuating units U1, and each actuating unit U1 includes a first flexible actuating film layer **544*a*, a first electrode plate 542*a*, a second flexible actuating film layer 544*b*, and a second electrode plate 542*b*, which are stacked outward in sequence from a position close to the display panel 120. The first flexible actuating film layer 544*a* closest to the display panel 120 is connected to the rear side 124 of the display panel 120 through a connecting structure 546**.

The first electrode plate **542*a* and the second electrode plate 542*b* are both fixedly arranged in the display device 100, and both provided with a plurality of holes 5422*a* and 5422*b***.

The first flexible actuating film layer **544*a* includes a first electret layer 5442*a* and a first electrode layer 5444*a*, and the second flexible actuating film layer 544*b* includes a second electret layer 5442*b* and a second electrode layer 5444*b*. The first electrode layer 5444*a* is electrically connected to the second electrode plate 542*b* to receive a first voltage signal S1, and the second electrode layer 5444*b* is electrically connected to the first electrode plate 542*a* to receive a second voltage signal S2. The first voltage signal S1 is different from the second voltage signal S2. In this way, an electric field is formed between the first flexible actuating film layer 544*a* and the first electrode plate 542*a* to drive the first flexible actuating film layer 544*a* to vibrate along an electric field direction D2, and an electric field is formed between the second flexible actuating film layer 544*b* and the second electrode plate 542*b* to drive the second flexible actuating film layer 544*b* to vibrate along an electric field direction D3. By appropriately setting electric charges of the first electret layer 5442*a* and the second electret layer 5442*b* (in an embodiment, giving opposite electric charges to the first electret layer 5442*a* and the second electret layer 5442*b*), the first flexible actuating film layer 544*a* and the second flexible actuating film layer 544*b*** have the same actuating direction.

In an embodiment, the thin film actuator 540 includes an insulating film layer 547, located on one side of the thin film actuator 540 facing the display panel 120 for electrical insulation.

Compared with the embodiment in FIG. 2, the thin film actuator 540 in this embodiment includes a plurality of electrode plates 542 and a plurality of flexible actuating film layers 544, which provide a larger driving force to drive the display panel 120 to vibrate to generate sound.

Figure 6:
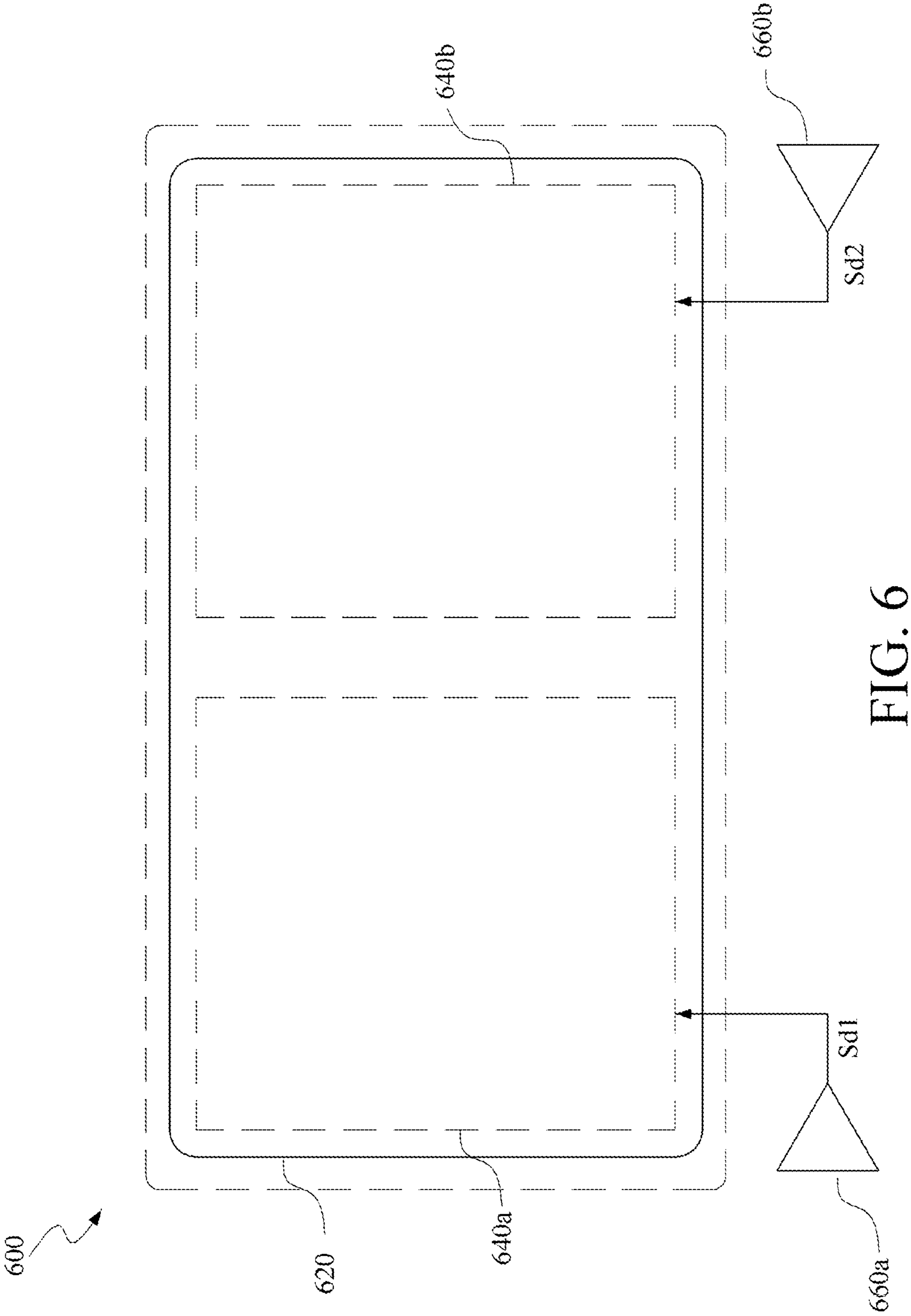
FIG. 6 is a schematic diagram of the display device according to the second embodiment of the disclosure.

FIG. 6 is a schematic diagram of the display device 600 according to the second embodiment of the disclosure.

As shown in the figure, the display device 600 in this embodiment includes two thin film actuators **640*a* and 640*b*. The two thin film actuators 640*a* and 640*b* are located on a rear side of a display panel 620 and correspond to positions at a left-half part and a right-half part of the display panel 620** respectively.

The thin film actuator **640*a* located on the left-half part is electrically connected to a drive circuit 660*a* to receive a drive signal Sd1 corresponding to a left sound channel, to drive the left-half part of the display panel 620 to vibrate to generate sound. The thin film actuator 640*b* located on the right-half part is electrically connected to a drive circuit 660*b* to receive a drive signal Sd2 corresponding to a right sound channel, to drive the right-half part of the display panel 620 to vibrate to generate sound. In this way, the display panel 620** is used to generate a sound generating effect of the two sound channels.

Figure 7:
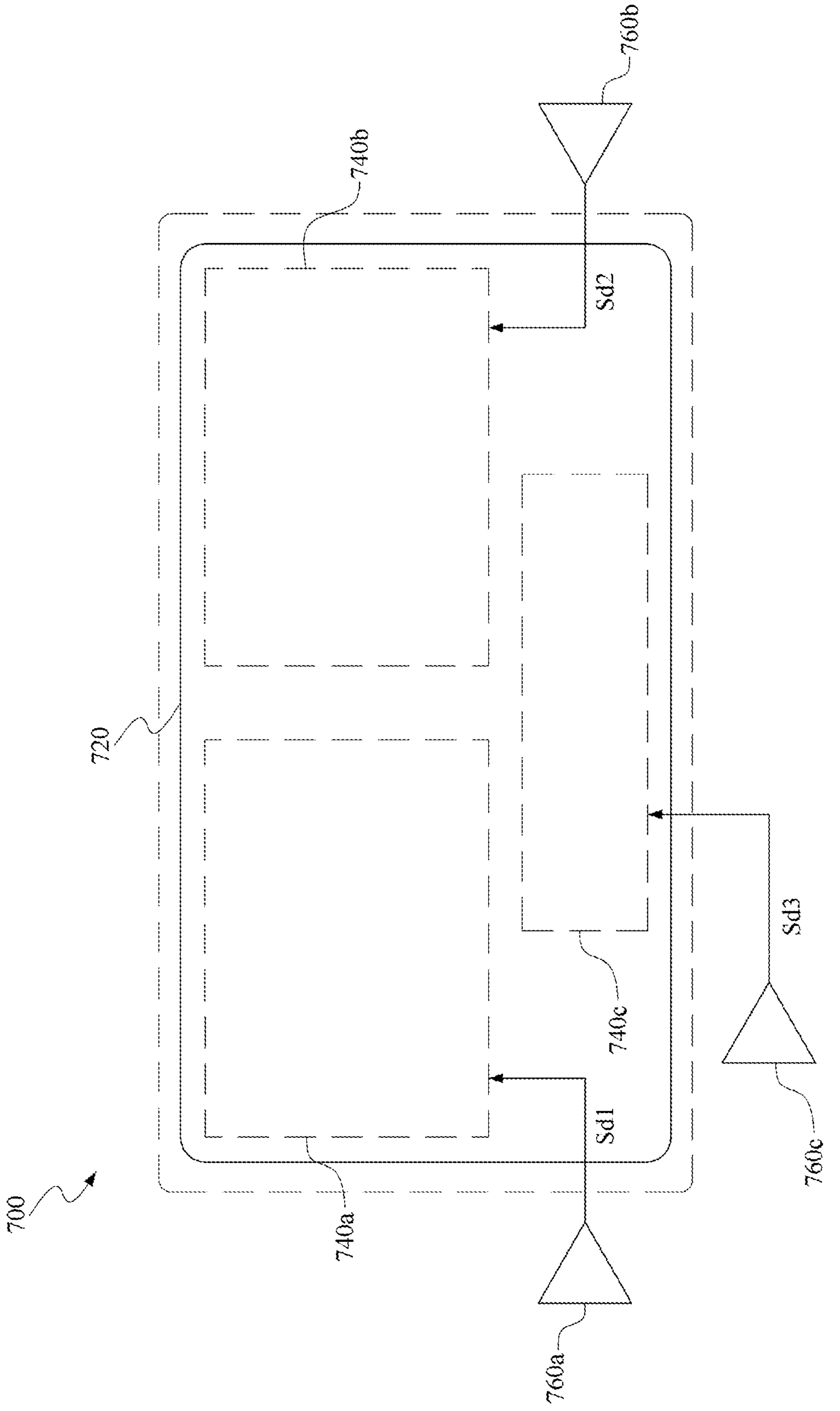
FIG. 7 is a schematic diagram of the display device according to the third embodiment of the disclosure.

FIG. 7 is a schematic diagram of the display device 700 according to the third embodiment of the disclosure.

As shown in the figure, the display device 700 in this embodiment includes three thin film actuators 740*a*, 740*b*, and 740*c*.

The three thin film actuators 740*a*, 740*b*, and 740*c* are located on a rear side of a display panel 720 and correspond to positions of a left side of an upper part, a right side of the upper part, and a lower part of the display panel 720 respectively.

The thin film actuator 740*a* located on the left side of the upper part is electrically connected to a drive circuit 760*a* to receive a drive signal Sd1 corresponding to a left sound channel, to drive the left side of the upper part of the display panel 720 to vibrate to generate sound. The thin film actuator 740*b* located on the right side of the upper part is electrically connected to a drive circuit 760*b* to receive a drive signal Sd2 corresponding to a right sound channel, to drive the right side of the upper part of the display panel 720 to vibrate to generate sound. The thin film actuator 740*c* located on the lower part is electrically connected to a drive circuit 760*c* to receive a drive signal Sd3 corresponding to a bass, to drive the lower part of the display panel 720 to vibrate to generate sound. In this way, the display panel 720 is used to generate a sound generating effect of a 2.1 sound channel.

In the display device 100 provided in the disclosure, the thin film actuators 140, 240, 340, 440, 540, 640*a*, 640*b*, 740*a*, 740*b*, and 740*c* arranged on the rear side of the display panel 120 are used to drive the display panel 120 to vibrate to generate sound. Therefore, the display device 100 provided in the disclosure does not need a bezel reserving space for a speaker, and ensures that the display device 100 generates sound to a user, to provide the user with a better use experience.

The foregoing descriptions are merely preferred embodiments of the disclosure, and do not limit the disclosure. Any form of equivalent replacement or modification made by a person skilled in the art to the technical means and technical content disclosed in the disclosure without departing from the scope of the technical means of the disclosure falls within the scope of the claims of the disclosure without departing from the content of the technical means of the disclosure.

What is claimed is:

1. A display device, comprising:

a display panel, comprising a front side and a rear side that are opposite to each other; and two thin film actuators, arranged on the rear side, wherein the two thin film actuators indirectly drive the display panel to vibrate through a vibrating cavity or a connecting structure, wherein the two thin film actuators are respectively located at positions that are on the rear side and correspond to a left-half part and a right-half part of the display panel.

2. The display device according to claim 1, wherein each of the two thin film actuators comprises an electrode plate and a flexible actuating film layer, and the flexible actuating film layer is a layered structure with an electret layer and an electrode layer.

3. The display device according to claim 1, wherein each of the two thin film actuators comprises a plurality of electrode plates and a plurality of flexible actuating film layers, and each of the plurality of flexible actuating film layers is a layered structure with an electret layer and an electrode layer, and the electrode plates are interleaved with the flexible actuating film layers.

4. The display device according to claim 2, wherein the flexible actuating film layer is connected to the rear side of the display panel through the connecting structure.

5. The display device according to claim 2, wherein the vibrating cavity exists between the display panel and the two thin film actuators, and the flexible actuating film layer drives the display panel to vibrate through the vibrating cavity.

6. The display device according to claim 2, wherein the electrode plate is provided with a plurality of holes.

7. The display device according to claim 1, wherein the display panel is an organic light-emitting diode display panel.

8. A display device, comprising:

a display panel, comprising a front side and a rear side that are opposite to each other; and three thin film actuators, arranged on the rear side, wherein the three thin film actuators indirectly drive the display panel to vibrate through a vibrating cavity or a connecting structure, wherein the three thin film actuators are respectively located at positions that are on the rear side and correspond to a left side of an upper part, a right side of the upper part, and a lower part of the display panel.

* * * * *